(12) United States Patent
Jin

(10) Patent No.: US 8,189,437 B2
(45) Date of Patent: May 29, 2012

(54) OPTICAL DISC PLAYBACK DEVICE AND CONTROL METHOD THEREOF

(75) Inventor: Jang Ho Jin, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/980,594

(22) Filed: Dec. 29, 2010

(65) Prior Publication Data
US 2011/0164484 A1 Jul. 7, 2011

(30) Foreign Application Priority Data
Jan. 4, 2010 (KR) .................................... 2010-274

(51) Int. Cl.
*G11B 19/00* (2006.01)
(52) U.S. Cl. ................. 369/47.14; 369/53.14; 369/53.15
(58) Field of Classification Search ............... 369/47.14, 369/53.14, 53.15
See application file for complete search history.

(56) References Cited

U.S. PATENT DOCUMENTS
7,983,139 B2 * 7/2011 Hurst et al. ................. 369/275.1
2003/0163617 A1 8/2003 Shigenobu OTHER PUBLICATIONS
European Search Report issued Apr. 19, 2011 in EP Application No. 11150033.6.

* cited by examiner

*Primary Examiner* — Aristotelis Psitos
(74) *Attorney, Agent, or Firm* — Stanzione & Kim, LLP (57) ABSTRACT

An optical disc playback device is capable of being transitioned to a sleep mode in consideration of an optical disc status or an optical disc drive device status. An optical disc playback apparatus includes a main controller to transmit a sleep mode transition command to an optical disc drive device, and an optical disc drive device controller to check either a status of an optical disc or a status of the optical disc drive device when the sleep mode transition command is transmitted to the optical disc drive device, and to determine whether to perform transition to the sleep mode in response to the optical disc status or the optical disc drive device status.

30 Claims, 9 Drawing Sheets

OPTICAL DISC PLAYBACK DEVICE AND CONTROL METHOD THEREOF

CROSS-REFERENCE TO RELATED APPLICATIONS

This application claims the benefit of priority under 35 U.S.C. §119 to Korean Patent Application No. 2010-0000274, filed on Jan. 4, 2010 in the Korean Intellectual Property Office, the disclosure of which is incorporated herein by reference in its entirety.

BACKGROUND

1. Field of the Invention

Embodiments of the present general inventive concept relate to an optical disc playback device including a sleep mode function and a method of controlling the same.

2. Description of the Related Art

Multimedia playback devices may be classified into portable multimedia playback devices carrying a battery and stationary multimedia playback devices driven by household AC power. Portable multimedia playback devices carrying a battery may have a function to reduce an amount of power consumption requisite for a playback mode so as to increase a battery lifetime. Most consumers prefer to use a specific product that requires limited power consumption from among various kinds of stationary multimedia playback devices. A variety of methods for limiting power consumption requisite for such a multimedia playback device have been proposed, such as reducing power consumption during a sleep mode.

The sleep mode is a specific mode that stops operations of some drive circuits and a motor using a difference between a transfer rate of media data and a playback rate of data while video data and audio data are output. In order to reduce power consumption in the sleep mode, stability is of importance to a function for stably reproducing media data and a function for restoring an operation suspended at a sleep mode in a normal status.

However, an optical disc playback device, for example, may be unstable in a playback status in the same manner as in a failure in reading data of an optical disc, and may also have unique defects such as eccentricity, deviation, and other defects. In the case where a playback status of the optical disc playback device is unstable or there is a defect in an optical disc, the stability of a specific function that restores an operation suspended at the sleep mode to a normal status is reduced, such that it is impossible to carry out the specific function or the processing time is increased.

SUMMARY

Therefore, it is an aspect of the present general inventive concept to provide an optical disc playback device to determine whether to perform transition to a sleep mode according to either an optical disc status or an optical disc drive device status, and a method of controlling the same.

Additional aspects of the general inventive concept will be set forth in part in the description which follows and, in part, will be obvious from the description, or may be learned by practice of the general inventive concept.

Features and/or utilities of the present general inventive concept may be realized by an optical disc playback apparatus including a main controller to transmit a sleep mode transition command to an optical disc drive device, and an optical disc drive device controller to check either a status of an optical disc or a status of the optical disc drive device when the sleep mode transition command is transmitted to the optical disc drive device, and to determine whether to perform transition to the sleep mode in response to the optical disc status or the optical disc drive device status.

The optical disc drive device controller may recognize an eccentricity amount of the optical disc and decide not to perform transition to the sleep mode when the recognized eccentricity amount of the optical disc is equal to or greater than a reference value.

The optical disc drive device controller may recognize a deviation amount of the optical disc and decide not to perform transition to the sleep mode when the recognized deviation amount of the optical disc is equal to or greater than a reference value.

The optical disc drive device controller may recognize a defect of the optical disc and decide not to perform transition to the sleep mode when the defect is present in the optical disc.

The optical disc drive device controller may determine whether the optical disc drive device fails to read data and decide not to perform transition to the sleep mode when the optical disc drive device fails to read data.

The optical disc drive device controller may determine whether the optical disc drive device is reading data from an area contained in a reference range from an outermost circumference of the optical disc and decide not to perform transition to the sleep mode when the optical disc drive device is reading data from an area contained in the reference range from the outermost circumference of the optical disc.

The optical disc drive device controller may detect a temperature of the optical disc drive device and decide not to perform transition to the sleep mode when the detected temperature is out of a reference temperature range.

The apparatus may further include a data buffer to store output data of the optical disc drive device and a buffer data detector to detect an amount of the data stored in the data buffer.

If the buffer data detector detects that the data stored in the data buffer is equal to or greater than a reference value the main controller may transmit the sleep mode transition command to the optical disc drive device controller.

Features and/or utilities of the present general inventive concept may also be realized by an optical disc playback apparatus to store output data of an optical disc drive device in a data buffer, and to output the stored data as video or audio data, the apparatus including a buffer data detector to detect an amount of data stored in the data buffer, a main controller to transmit a sleep mode transition command to the optical disc drive device when the detected data amount is equal to or greater than a reference value, and an optical disc drive device controller to recognize either a status of an optical disc or a status of the optical disc drive device when the sleep mode transition command is transmitted to the optical disc drive device, and to determine whether to perform transition to the sleep mode in response to the optical disc status or the optical disc drive device status.

The optical disc drive device controller may recognize an eccentricity amount of the optical disc and decide not to perform transition to the sleep mode when the recognized eccentricity amount of the optical disc is equal to or greater than a reference value.

The optical disc drive device controller may recognize a deviation amount of the optical disc and decide not to perform transition to the sleep mode when the recognized deviation amount of the optical disc is equal to or greater than a reference value.

The optical disc drive device controller may recognize a defect of the optical disc and decide not to perform transition to the sleep mode when the defect is present in the optical disc.

The optical disc drive device controller may determine whether the optical disc drive device fails to read data and decide not to perform transition to the sleep mode when the optical disc drive device fails to read data.

The optical disc drive device controller may determine whether the optical disc drive device is reading data from an area contained in a reference range from an outermost circumference of the optical disc and decide not to perform transition to the sleep mode when the optical disc drive device is reading data from an area contained in the reference range from the outermost circumference of the optical disc.

The optical disc drive device controller may detect a temperature of the optical disc drive device and decide not to perform transition to the sleep mode when the detected temperature is out of a reference temperature range.

Features and/or utilities of the present general inventive concept may also be realized by a method of controlling an optical disc playback apparatus including determining whether a current status is equal to a specific status capable of being transitioned to a sleep mode, recognizing at least one of a status of an optical disc and a status of an optical disc drive device when the current status is equal to the specific status capable of being transitioned to the sleep mode, and determining whether to perform transition to the sleep mode according to the optical disc status or the optical disc drive device status.

The optical disc playback device may include a data buffer to store data generated from the optical disc drive device and to determine the specific status capable of being transitioned to the sleep mode when an amount of data stored in the data buffer is equal to or greater than a reference value.

The determining whether to perform transition to the sleep mode according to the optical disc status may include recognizing an eccentricity amount of the optical disc and deciding not to perform transition to the sleep mode when the recognized eccentricity amount of the optical disc is equal to or greater than a reference value.

The determining whether to perform transition to the sleep mode according to the optical disc status may include recognizing a deviation amount of the optical disc and deciding not to perform transition to the sleep mode when the recognized deviation amount of the optical disc is equal to or greater than a reference value.

The determining whether to perform transition to the sleep mode according to the optical disc status may include recognizing a defect of the optical disc and deciding not to perform transition to the sleep mode when the defect is present in the optical disc.

The determining whether to perform transition to the sleep mode according to the optical disc drive device status may include determining whether the optical disc drive device fails to read data and deciding not to perform transition to the sleep mode when the optical disc drive device fails to read data.

The determining whether to perform transition to the sleep mode according to the optical disc drive device status may include determining whether the optical disc drive device is reading data from an area contained in a reference range from an outermost circumference of the optical disc and deciding not to perform transition to the sleep mode when the optical disc drive device is reading data from an area contained in the reference range from the outermost circumference of the optical disc.

The determining whether to perform transition to the sleep mode according to the optical disc drive device status may include detecting a temperature of the optical disc drive device and deciding not to perform transition to the sleep mode when the detected temperature is outside of a reference temperature range.

Features and/or utilities of the present general inventive concept may also be realized by an optical disc drive apparatus including a controller to receive an input to direct the optical disc drive device to enter a sleep mode, to detect a status of at least one of an optical disc and the optical disc drive apparatus, and to determine whether to direct the optical disc drive device to enter the sleep mode based on the detected status of the at least one of the optical disc and the optical disc drive apparatus.

The optical disc drive apparatus may further include a connection terminal to receive the data to direct the optical disc drive to enter the sleep mode and to transmit data indicating that the sleep mode is disabled based on the detected status of the at least one of the optical disc and the optical disc drive apparatus.

The optical disc drive apparatus may further include an optical pickup to read data from and write data to the optical disc, motor control circuitry to control operation of the optical pickup and the optical disc, and an outer case to surround the optical pickup and the motor control circuitry.

The optical disc drive apparatus may further include an optical pickup to read data from the optical disc and to detect the status of the optical disc.

The status of the optical disc may be one of the eccentricity and deviation of the optical disc.

The status of the optical disc drive apparatus may be one of a temperature of the optical disc drive apparatus, a determination of a failure of an optical pickup to read data from the optical disc, and a determination of region of the optical disc read by the optical pickup.

Features and/or utilities of the present general inventive concept may also be realized by an optical disc apparatus including a host to detect a predetermined condition and to output a sleep command signal when the predetermined condition is detected, and an optical disc drive device to receive the sleep command signal to direct the optical disc drive device to enter a sleep mode, to detect a status of at least one of an optical disc and the optical disc drive device, and to prevent the optical disc drive device from entering the sleep mode based on the at least one of the status of the optical disc and the status of the optical disc drive device.

The host may include a data buffer to receive data from the optical disc drive device corresponding to data read from the optical disc, and the host may output the sleep command signal when the data buffer is filled with a predetermined amount of data.

Features and/or utilities of the present general inventive concept may also be realized by a method of controlling an optical disc drive device, the method including receiving a command to place the optical disc drive device in a sleep mode, detecting a status of at least one of an optical disc and the optical disc drive device, and determining whether to place the optical disc drive device in the sleep mode based on the detected status of the at least one of the optical disc and the optical disc drive device.

Determining whether to place the optical disc drive device in the sleep mode may include not placing the optical disc drive device in the sleep mode when the detected status of the at least one of the optical disc and the optical disc drive meets a predetermined condition.

Not placing the optical disc drive device in the sleep mode may include ignoring the command to place the optical disc drive device in the sleep mode.

Not placing the optical disc drive device in the sleep mode may include generating a notice to indicate that the optical disc drive device is not placed in the sleep mode.

The method may further include reading data from the optical disc, transmitting the read data to a data buffer, detecting a remaining data capacity of the data buffer, and sending the command to place the optical disc drive device in the sleep mode when the capacity of the data buffer is below a predetermined threshold.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Referring to FIGS. 1 to 5, the optical disc playback device includes a host 200 and an optical disc drive device 100.

Figure 1:
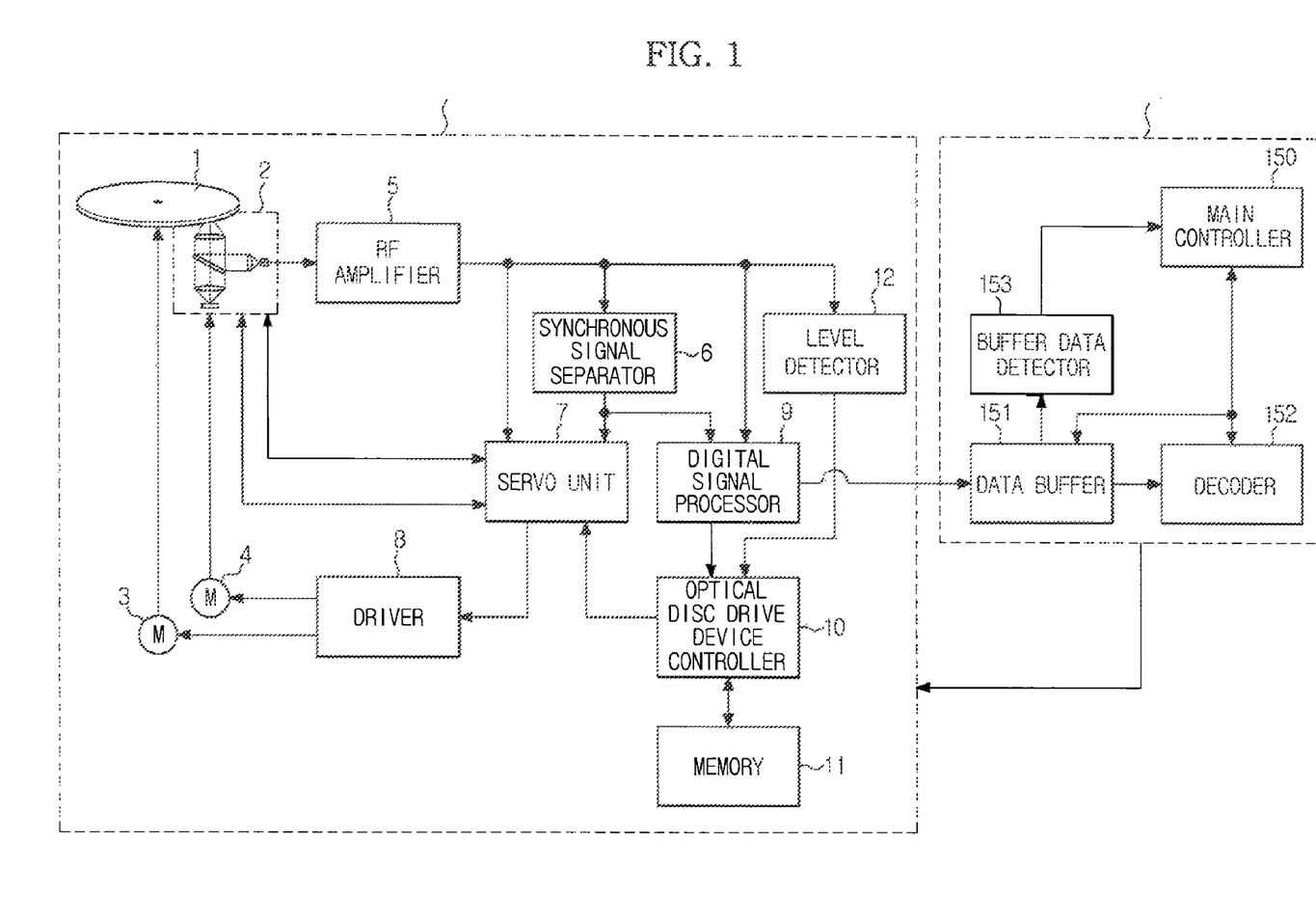
FIG. 1 is a block diagram illustrating an optical disc playback device according to one embodiment of the present general inventive concept.

The host 200 includes a main controller 150, a decoder 152, a data buffer 151, and a buffer data detector 153.

The main controller 150 controls and manages the overall control operations of the optical disc device. If the controller 150 confirms that data of more than a first reference value is stored in the data buffer 151, it transmits a sleep-mode transition command to the optical disc drive device controller 10. If it is determined that data stored in the data buffer 151 is equal to or less than a second reference value after a current mode has been transitioned to the sleep mode, the main controller 150 transmits a normal read-mode transition command to the optical disc drive device controller 10. After data output from the optical disc drive device controller 10 is stored in the data buffer 151, the main controller 150 controls the data to be output as video or audio data after passing through the decoder 152. In the meantime, the first reference value and the second reference value may be determined by a designer. The first and second values may be the same value or different values, according to the design determined by the designer.

The decoder 152 decodes a signal-processed digital signal, and thus outputs an original video or audio signal.

Figure 2:
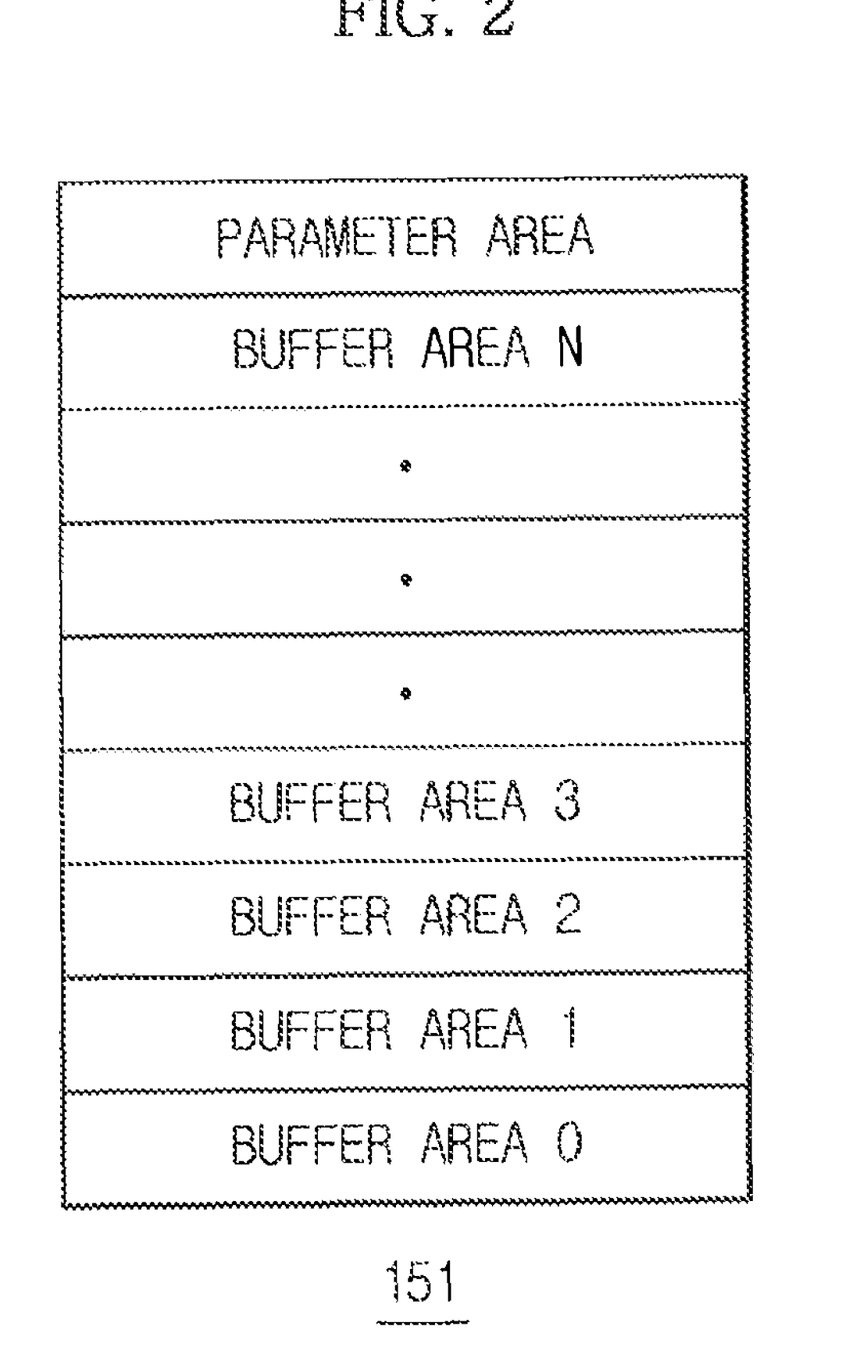
FIG. 2 is a configuration view illustrating a data buffer contained in an optical disc playback device according to one embodiment of the present general inventive concept.

The data buffer 151 stores data output from the optical disc drive device 100, transmits the stored data to the decoder 152, and thus outputs video or audio data. The data buffer 151 may be classified into a parameter area and a buffer area. The parameter area stores data related to an optical disc 1 or data related to drive information, such as Table Of Contents (TOC) or Inquiry. The buffer area stores data output from the optical disc drive device 100. Referring to FIG. 2, if the optical disc drive device 100 outputs initial data, data is stored in "buffer area 0". Data stored in the data buffer 151 is then output to the decoder 152. While data is output, next data is transmitted, and the transmitted data is stored in "buffer area 1". An operation for receiving data from the optical disc drive device 100 and entering the received data in the data buffer 151, and an operation for outputting the buffered data to the decoder 152 are carried out separately from each other.

The buffer data detector detects an amount of data stored in the data buffer 151. The buffer data detector 153 calculates the number of data blocks (or the number of data bytes) stored in the data buffer 151, and thus calculates an amount of data. If one data block is input to the data buffer 151, the buffer data detector 153 increases the number of data blocks by one. If one data block is output to the decoder 152, the buffer data detector 153 reduces the number of data blocks by one. The buffer data detector 153 acts as a block counter for counting the number of current blocks remaining in the data buffer 151. The data buffer detector 153 may serve as a byte counter. In more detail, whenever one data byte is input to the data buffer 151, the buffer data detector 153 acting as the byte counter increases the number of data bytes by one. Whenever one data byte is output, the buffer data detector 153 reduces the number of data bytes by one.

The optical disc drive device 100 includes a spindle motor 3 for rotating the optical disc at a given speed; an optical pickup 2 for reading a signal recorded in the optical disc 1; a sled motor 4 for moving the optical pickup to a radial direction of the optical disc 1; a driver 8 for driving the spindle motor 3 and the sled motor 4; a radio frequency (RF) amplifier 5 for filtering a record signal of the read optical disc 1 and outputting the filtered result as an RF signal; a synchronous signal separator 6 for separating a synchronous signal (Sync) from the filtered RF signal; a digital signal processor 9 for processing the RF signal into a digital signal according to the separated digital signal; a servo unit 7 for controlling servo operations of the optical pickup 2 and the driver 8, and for driving a focus actuator of a focus servo (not shown) and a tracking actuator of a tracking servo (not shown); a level detector 12 for detecting an RF output level of the RF amplifier 5; an optical disc drive device controller 10 for detecting the presence or absence of a defect of the optical disc 1 according to the detected RF level, and controlling the servo unit 7; and a memory 11 for storing data required for control operations.

The optical disc drive device controller 10 detects eccentricity, deviation, and other defects of the optical disc 1. Deviation, as defined in the present specification and claims, means the degree of inconsistency in parallelism between a seated surface and a signaling surface of the optical disc 1. Eccentricity, as defined in the present specification and claims, means the degree of inconsistency between a geometrical center and a rotation center of an optical disc track. Defects, as defined in the present specification and claims, refer to scratches, fingerprints, or other marks marring a signaling surface of the optical disc 1 which are created in manufacturing, storage, and handling of the optical disc 1.

Figure 4A:
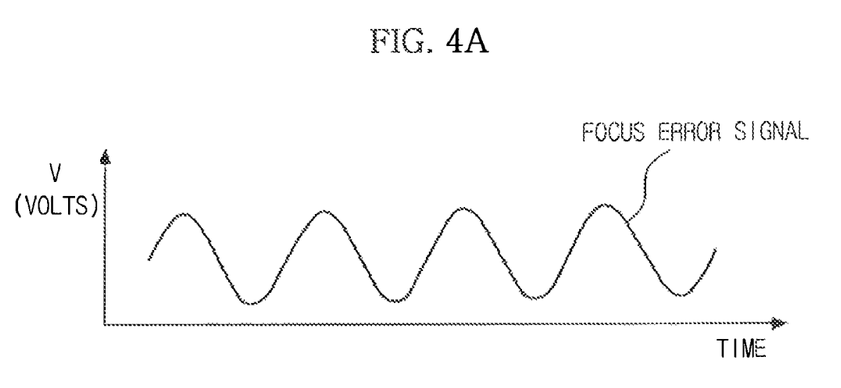
FIG. 4A is a waveform diagram illustrating a focus error signal used for measuring the deviation amount.

The deviation of the optical disc 1 can be calculated as follows. The optical pickup 2 moves to a specific location and measures the magnitude of a focus error signal under the condition of a track-on and focus-on. The signal shown in FIG. 4A is a focus error signal used to measure the amount of deviation of the optical disc 1. As the deviation amount of the disc is increased with respect to the same focus loop gain, the focusing variation is increased proportional to the deviation amount of the disc. As a result, the amount of uncontrolled deviation is increased, so that the amplitude of a sine wave generated in the focus error signal of FIG. 4A is increased.

Specific information indicating whether the deviation amount of the optical disc 1 is relatively large can be recognized by measurement of the amplitude of the focus error signal. In order to increase measurement resolution, a focus loop gain is reduced in such a manner that the output of the focus error signal is increased. The focus error signal is read from the digital signal processor 9, so that the amplitude of the focus error signal is calculated. Deviation amount can be calculated according to the amplitude magnitude.

In more detail, the optical pickup 2 moves to a specific position upon receiving a control signal from the optical disc drive device controller 10, such that the optical pickup 2 can discriminate the deviation from a reference position. The optical disc drive device controller 10 moves the objective lens up and down with respect to the surface of the disc 1, so that it moves the optical pickup 2 to a specific position and causes the focus error signal to be generated. In this case, the reference position means a location before the focus-on operation. The specific position for discriminating the deviation means a certain position where the focus error signal of the optical disc 1 is detected, is predetermined by a manufacturer, and is on the order of hundreds of micrometers (μm) or about several millimeters (mm). The focus error signal is generated when the focus-on status is provided. That is, if a beam converged by the objective lens is accurately focused on a focal point, or if the beam is out of a predetermined range from the focal point, no focus error signal is generated. The digital signal processor 9 measures the amplitude of the focus error signal amplitude, and averages a measurement value of the focus error signal, so as to calculate an average value of the focus error signal. The reason why the digital signal processor 9 calculates the average value of the focus error signal is to exclude noise generated by initial vibration from objective signals to be detected.

Figure 3:
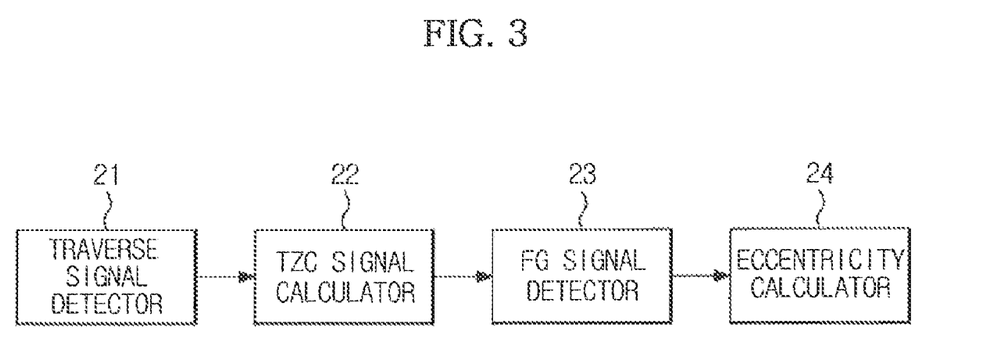
FIG. 3 is a block diagram illustrating a function for calculating an amount of eccentricity of an optical disc drive device contained in an optical disc playback device according to one embodiment of the present general inventive concept.
Figure 4B:
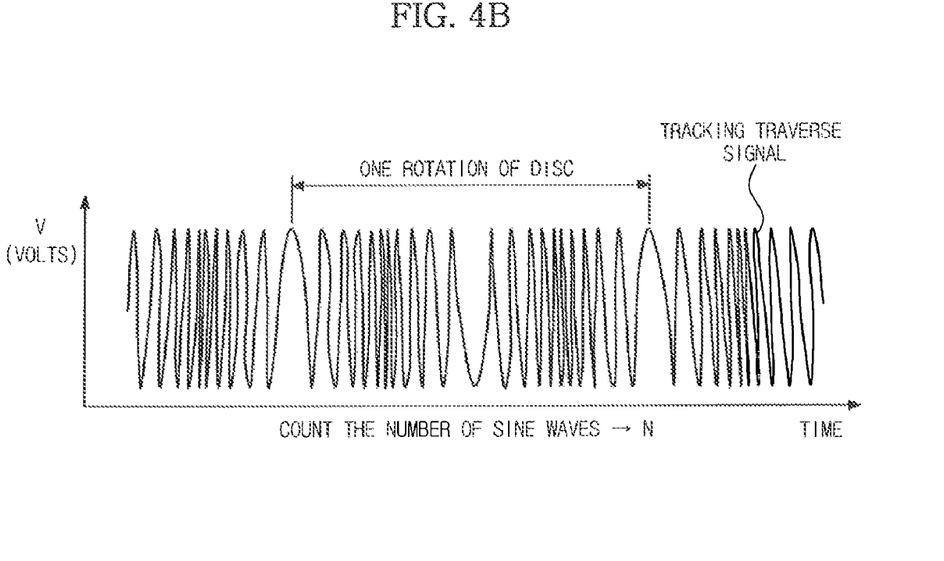
FIG. 4B is a waveform diagram illustrating a tracking error signal used for measuring an amount of eccentricity.

The eccentricity of the optical disc 1 can be measured as follows. A Tracking Zero Count (TZC) signal is used to determine how many tracks are crossed with the tracking traverse signal during one rotation of the optical disc 1, and the eccentricity of the optical disc 1 is measured using the counted value of the TZC and the track pitch of the optical disc 1. FIG. 4B is a waveform diagram illustrating a tracking error signal for generating the TZC signal. With regard to the tracking error signal under the condition that only the focus control is performed, the track traverse signal is output as shown in FIG. 4B. The number of sine waves output during one rotation of the optical disc 1 is changes according to the eccentricity degree of the optical disc 1. As a result, the number of sine waves output during one rotation of the optical disc 1 is counted, so that the eccentricity degree of the optical disc 1 can be calculated. For these purposes, the TZC signal which is used to count the number of tracks traversed in a search mode of the optical pickup 2 is used to measure the eccentricity degree of the optical disc 1. The eccentricity amount or degree of the optical disc can be calculated by multiplying the number of sine waves output during one rotation of the optical disc by half of the track pitch. Referring to FIG. 3, the eccentricity measurement block contained in the optical disc drive device controller 10 may include a traverse signal detector 21, a TZC signal calculator 22, a frequency generator (FG) signal detector 23, and an eccentricity calculator 24.

Under the condition that the track servo is turned off and the focus servo is turned on, the traverse signal detector 21 detects a traverse signal generated by a difference in a reflected light amount between the track of the optical disc 1 and the other parts. The TZC signal calculator 22 counts how many tracks are crossed with the traverse signal detected by the traverse signal detector 21 using the TZC signal that is turned on or off at each track-cross point. In this case, the measurement of eccentricity amount is achieved by counting the TZC signal generated for one rotation of the spindle motor (i.e., one rotation of the optical disc 1), such that the eccentricity amount can be recognized by counting the number of frequency generator signals (FG signals) per rotation.

The FG signal detected by the FG signal detector 23 is generated by rotation of the spindle motor 3. The number of FG signals generated for each rotation of the optical disc 1 is variable. In general, the number of FG signals generated for one rotation of the optical disc is set to 6. The number of rotations of the optical disc is recognized on the basis of the FG signal detected by the FG signal detector 23, such that the count value of TZC signals for each rotation of the optical disc can be acquired from the TZC signal count information received from the TZC signal calculator 22.

The eccentricity calculator 24 calculates eccentricity in consideration of the count value of TZC signals for each rotation of the optical disc and the DVD track pitch (0.74 μm). If the count value of TZC signals per rotation of the optical disc is multiplied by half of the track pitch (e.g., 0.74 μm for a DVD), the multiplied result represents the actual eccentricity of the optical disc 1.

A variety of defects may occur in the optical disc 1. For example, a surface of the optical disc 1 may be scratched, a fingerprint or foreign material may be formed or located on the optical disc 1, or any other material or defect may cause a surface of the optical disc 1 to be misshapen or obscured. A scratch defect of the optical disc 1 may be determined by calculating an Error-Correcting Code (ECC) rate on the basis of the RF signal received from the optical pickup 2. That is, when the waveform of the RF signal is detected as being abnormal compared to a predetermined waveform (e.g., if the waveform of the RF signal is changed more slowly than a predetermined waveform), this means that an optical disc defect is present in a corresponding recording section.

Figure 5:
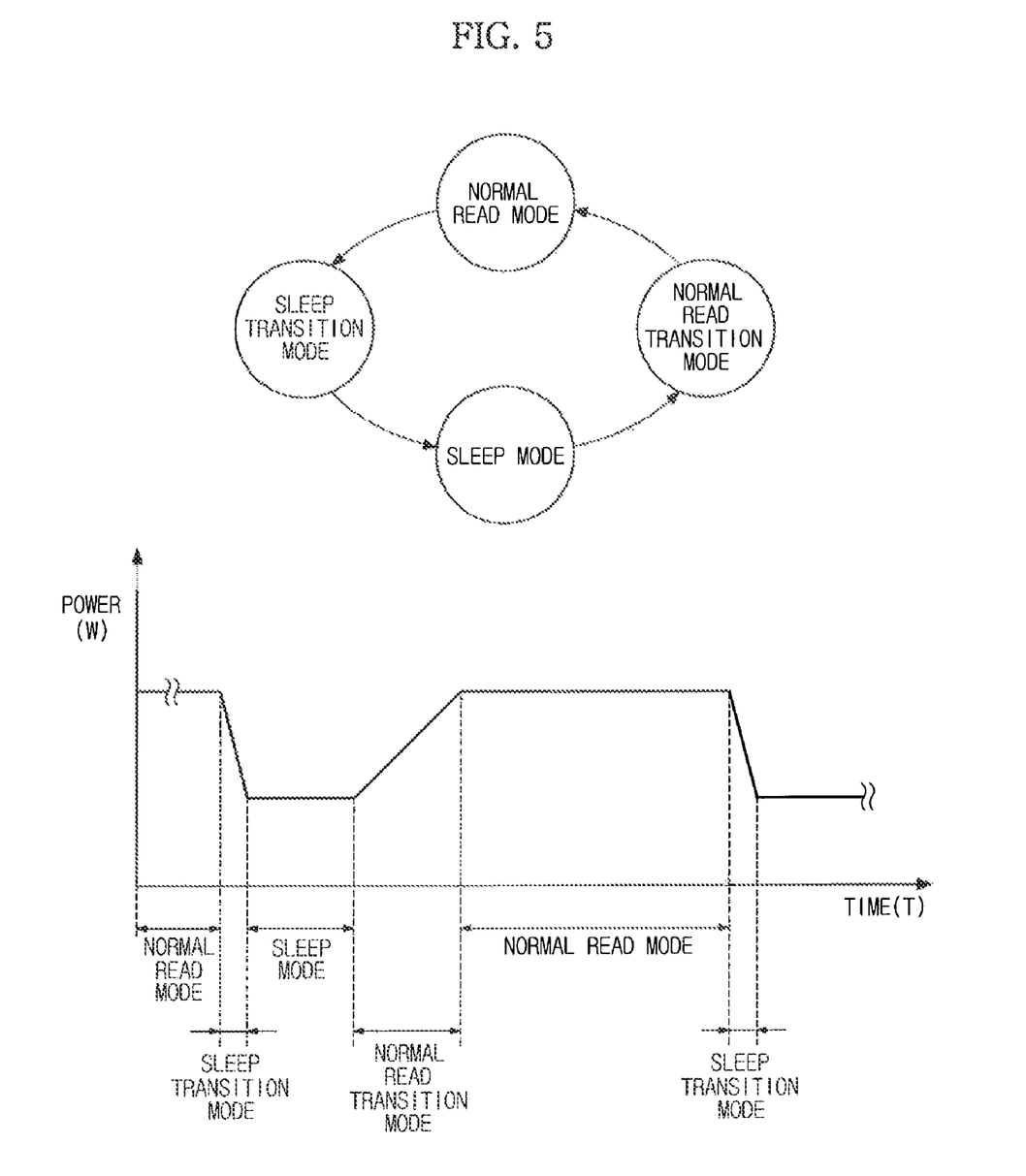
FIG. 5 illustrates modes for use in an optical disc playback device according to one embodiment of the present general inventive concept, and power consumption in individual modes.

The optical disc drive device controller 10 switches a current mode of the optical disc drive device 100 to a sleep mode according to a control signal of the main controller 150. In the sleep mode, only the optical disc drive device controller 10 is operated, and other chips contained in the optical disc drive device 100 are disabled, so that only a current value is stored in the memory 11. Referring to FIG. 5, the optical disc drive device 100 may include a normal read mode and a sleep mode. In more detail, the optical disc drive device 100 may further include a sleep transition mode for transition from the normal read mode to the sleep mode and a normal-read transition mode for transition from the sleep mode to the normal read mode. If the transition from the normal read mode to the sleep mode has occurred, this means that power consumption has been reduced.

If the optical disc drive device controller 10 receives a command for transition to the sleep mode from the main controller 150, it recognizes a status of the optical disc 1 and a status of the optical disc drive device 100, such that it determines whether to perform transition to the sleep mode. In this case, the status of the optical disc 1 may include deviation-, eccentricity-, and defect-states of the optical disc 1. Also, the status of the optical disc drive device 100 may include a failure to read data of the optical disc 1, a status for reading an address close to the outermost circumference of the optical disc, and a temperature status of the optical disc drive device 100. If deviation, eccentricity, or defect is present in the optical disc 1 or if the optical disc drive device 100 is unstable, it is difficult to carry out the transition from the sleep mode to the normal read mode, so that data may not be continuously reproduced or such data playback may be abruptly interrupted. Therefore, if any of the above-mentioned problems have occurred, the transition to the sleep mode is interrupted to maintain the normal read mode.

Upon receiving a command for transition to the sleep mode from the main controller 150, the optical disc drive device controller 10 determines whether the deviation or eccentricity of the optical disc 1 is equal to or greater than a reference value. If the eccentricity or deviation of the optical disc 1 is equal to or greater than the reference value, the optical disc drive device controller 10 prevents the optical disc drive device 100 from being transitioned to the sleep mode. For example, if the eccentricity of the optical disc 1 is 40 μm or greater, or if the deviation of the optical disc 1 is 0.2 mm or greater, the optical disc drive device controller 10 prevents the optical disc drive device 100 from transitioning to the sleep mode. In the meantime, the reference value is a threshold value decided by a designer.

The optical disc device controller 10 determines the presence or absence of a defect in the optical disc 1 upon receiving a command for transition to the sleep mode from the main controller 150. If the transition command for the sleep mode is received from the main controller 150 and there is a defect in the optical disc 1, the optical disc drive device 100 is not transitioned to the sleep mode. For example, if it is determined that a waveform of the RF signal was abnormal and the scratch or defect caused by foreign substances is present in the optical disc 1, the optical disc drive device controller 10 does not switch the optical disc drive device 100 to the sleep mode.

In the case where the optical disc drive device controller 100 receives the command for transition to the sleep mode from the main controller 150, and the optical pickup 2 has to read data from an optical disc address region from which the optical disc drive device 100 fails to read data, the optical disc drive device 100 is not transitioned to the sleep mode by the optical disc drive device controller 10.

If the optical disc drive device controller 10 receives a command for transition to the sleep mode from the main controller 150, it is determined whether the optical pickup 2 has to read data from a specific region close to the outermost circumference of the optical disc 1. If it is determined that the optical pickup 2 has to read data from the specific region close to the outermost circumference of the optical disc 1, the optical disc drive device 100 is not transitioned to the sleep mode. The outermost area of the optical disc 1 may be easily damaged by careless handle of a user. Therefore, when reading an address from an area within a predetermined radius of the outermost circumference of the optical disc 1, the optical disc drive device 100 is not transitioned to the sleep mode.

If the optical disc drive device controller 10 receives a command for transition to the sleep mode from the main controller 150, it determines whether a temperature of the optical disc drive device 100 is out of the reference range. If the temperature of the optical disc drive device 100 is out of the reference range, the optical disc drive device controller 10 controls the optical disc drive device 100 not to be transitioned to the sleep mode. The optical pickup 2 and the motor 3 or 4 contained in the optical disc drive device 100 are greatly affected by the temperature. If the temperature of the optical disc drive device 100 is out of a normal temperature range (e.g., 25~35° C.), playback performance is deteriorated. Therefore, if the temperature of the optical disc drive device 100 is out of the normal temperature range, it is difficult to perform transition from the sleep mode to the normal read mode, so that the optical disc drive device 100 is not transitioned to the sleep mode.

Figure 6:
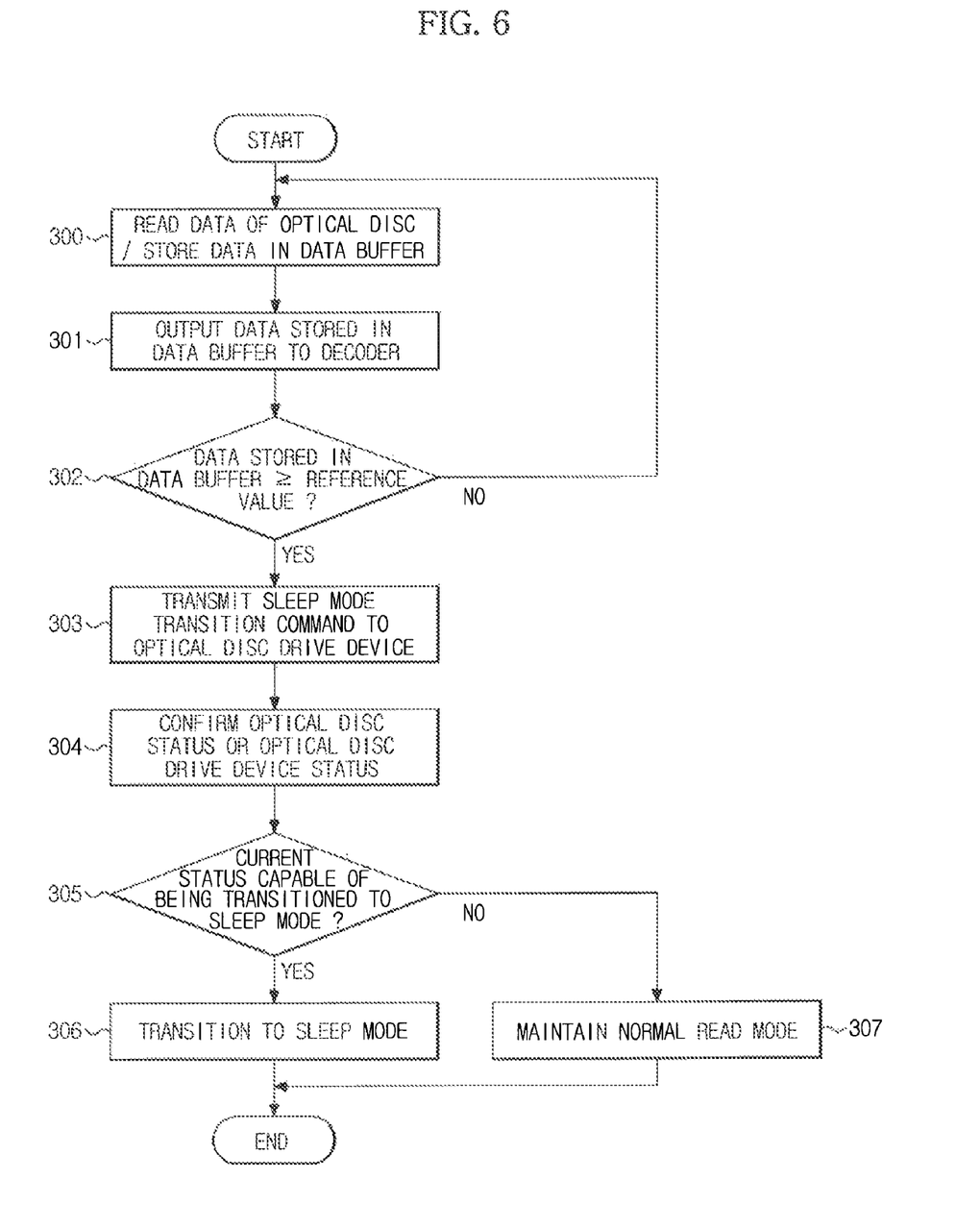
FIG. 6 is a flowchart illustrating operations of the optical disc playback device according to one embodiment of the present general inventive concept.

FIG. 6 is a flowchart illustrating operations of the optical disc playback device according to one embodiment of the present general inventive concept.

Referring to FIG. 6, the optical disc 1 is seated in the optical disc playback device. If a playback operation of the optical disc device starts, the optical disc drive device 100 reads data stored in the optical disc 1, and stores the read data in the data buffer 151 at operation 300.

Next, the data buffer 151 stores output data of the optical disc drive device 100, and at the same time outputs the stored data to the decoder 152. An operation for entering data of the optical disc drive device 100 in the data buffer 151, and another operation for outputting the buffered data to the decoder 152 are carried out separately from each other at operation 301.

The buffer data detector 153 determines whether an amount of data stored in the data buffer 151 is equal to or greater than a reference value. If one data block is received in the data buffer 151, the buffer data detector 153 increases the number of data blocks by one. If one data block is output to the decoder 152, the buffer data detector 153 reduces the number of data blocks by one. The buffer data detector 153 acts as a block counter for counting the number of current blocks remaining in the data buffer 151 at operation 302.

If it is determined that the amount of data stored in the data buffer is greater than the reference value on the basis of the signal received from the buffer data detector 153, a sleep mode transition command is transmitted to the optical disc drive device controller 10 at operation 303.

Next, if the optical disc drive controller 10 receives the sleep mode transition command from the main controller 150, it confirms any one of a status of the optical disc 1 or a status of the optical disc drive device 100. Confirmation of the status of the optical disc 1 is equal to confirmation of at least one of deviation, eccentricity, or defect of the optical disc 1. Confirmation of the status of the optical disc drive device 100 is equal to confirmation of at least one of a read failure status of the optical disc drive device, a status for reading data within a predetermined range of the outermost circumference of the optical disc 1, or a temperature status. Needless to say, the optical disc drive device controller 10 can confirm one or both of the optical disc 1' status and the optical disc drive device 100' status. According to design types, only a specific status (e.g., the eccentricity of the optical disc 1) from among the above-mentioned statuses may be confirmed at operation 304.

The optical disc drive device controller 10 determines whether the optical disc drive device 100 can be transitioned to the sleep mode according to either the status of the optical disc 1 or the status of the optical disc drive device 100. During the status capable of being transitioned to the sleep mode according to one aspect of the present general inventive concept, a variety of problems, such as a time delay or a transition failure, may be encountered when a normal mode is transitioned to the sleep mode and is then transitioned to the normal read mode. If the deviation or eccentricity of the optical disc 1 is greater than a reference value, the optical disc drive device controller 10 may confirm that it is impossible to perform the transition to the sleep mode. If a defect of the optical disc 1 has been found, the optical disc drive device controller 10 can confirm that it is impossible to perform the transition to the sleep mode. If the optical disc drive device 100 is in the read failure status of the optical disc 1, the optical disc drive device controller 10 can confirm that it is impossible to perform the transition to the sleep mode. If the optical disc drive device 100 has to read data within a predetermined radius of the outermost circumference of the optical disc 1, the optical disc drive device controller 10 can recognize that it is impossible for the optical disc drive device 100 to be transitioned to the sleep mode. If the temperature of the optical disc drive device 100 is out of a predetermined temperature range (e.g., 25~35° C.), it is determined that it is impossible for the optical disc drive device controller 10 to be transitioned to the sleep mode at operation 305.

Next, if it is possible for the optical disc drive device 100 to be transitioned to the sleep mode, the optical disc drive device controller 10 controls the optical disc drive device 100 to be transitioned to the sleep mode. If it is impossible for the optical disc drive device 100 to be transitioned to the sleep mode, the optical disc drive device controller 10 controls the optical disc drive device 10 to be maintained in the normal read mode at operations 306 and 307.

In the meantime, although the above-mentioned embodiment has disclosed that the optical disc playback device includes both the main controller 150 and the optical disc drive device controller 10, it should be noted that the optical disc playback device may include only one of the main controller 150 and the optical disc drive device controller 10.

As is apparent from the above description, the optical disc playback device determines whether to be transitioned to the sleep mode according to the optical disc status or the optical disc drive device status, such that the sleep mode function is applied to the optical disc playback device for driving either a defective optical disc or a defective optical disc drive device that encounters an unexpected problem in a playback status, resulting in the prevention of additional playback performance deterioration.

Figure 7:
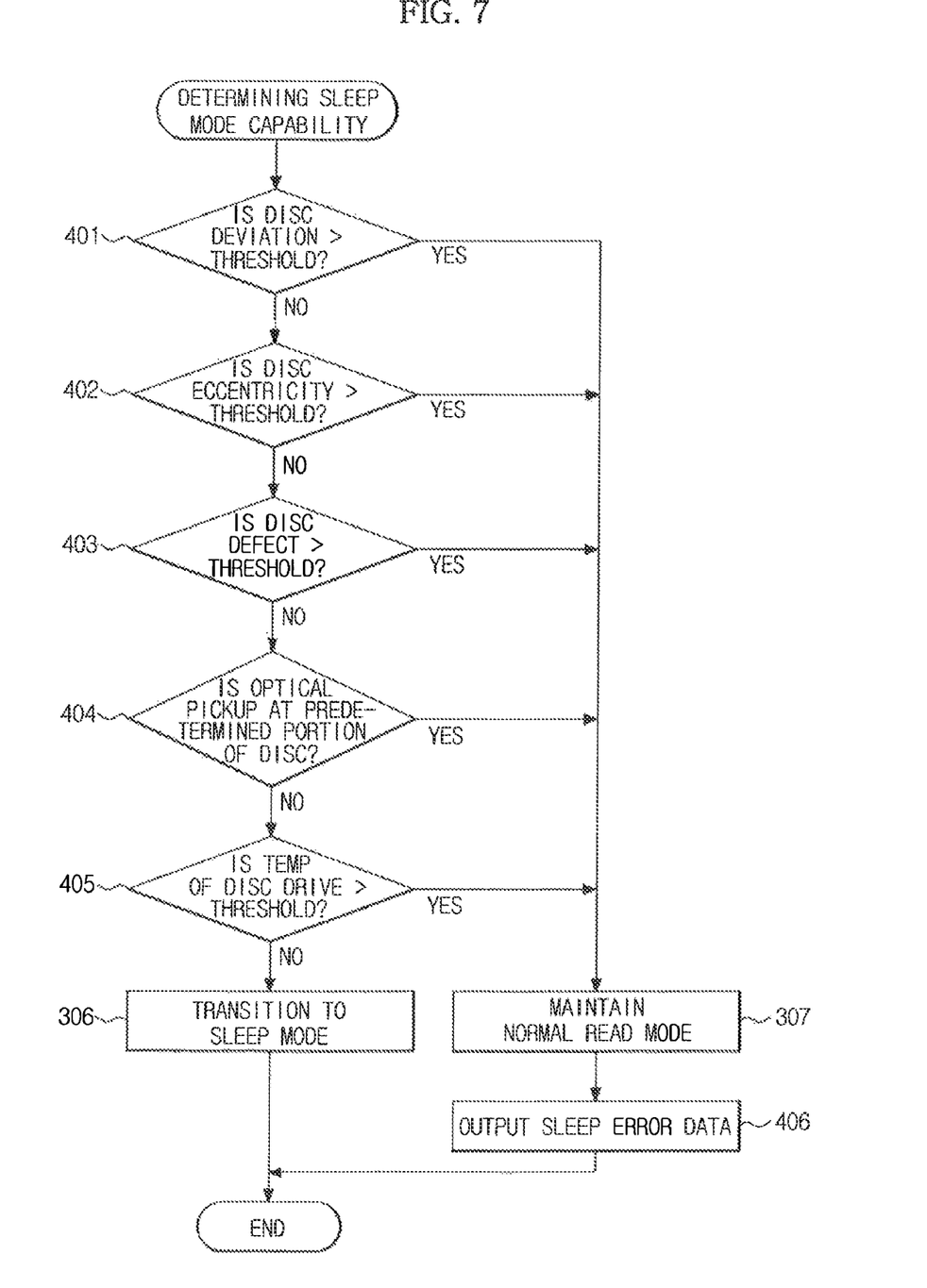
FIG. 7 is a flowchart illustrating a determining of sleep capability operation of an optical disc playback device.

FIG. 7 illustrates in further detail the determination in operation 305 of FIG. 6 whether the optical disc device 100 is capable of entering a low-power or sleep mode. Or in other words, FIG. 7 illustrates determining whether the conditions of the disc 1 or the optical disc drive device 100 are such that exiting a sleep mode may impair the function of the read/write processes of the optical disc drive, and when such conditions exist, preventing the optical disc drive device 100 from entering the sleep mode.

In operation 401, it is determined whether a deviation of the disc 1 is greater than a predetermined threshold. If not, then it is determined in operation 402 whether the eccentricity of the disc 1 is greater than a predetermined threshold. If not, then it is determined in operation 403 whether a defect in or on a surface of the disc 1 exists, or exists to an extent that is greater than a predetermined threshold. If not, then it is determined in operation 404 whether the optical pickup is reading or writing data from or to a predetermined portion of the disc 1, such as an outermost data region of the disc 1. If not, then it is determined if the temperature of the optical disc drive device 100 is outside a predetermined range defined by at least one of an upper and a lower threshold. If none of the above conditions exist, which may prevent the optical disc drive device 100 from exiting normally from a sleep mode to a normal read/write mode, then the optical disc drive device controller 10 may cause the optical disc drive device 100 to enter the sleep mode by shutting down or reducing the operation functionality of one or more devices and motors. On the other hand, if any one of the above conditions exists, then the optical disc drive device controller 10 may prevent the optical disc drive device 110 from entering the sleep mode in operation 307.

In addition, the controller 10 may generate output sleep error data 406 to inform the host 200 that the sleep mode could not be entered. The data may include a notice to be displayed to a user, for example, so that the user does not leave the device operating when not in use. For example, a user may be in the habit of leaving the device operating with the expectation that the device will automatically enter the sleep mode. According to an embodiment of the present general inventive concept, the optical disc drive device 100 may generate data to inform the user that the optical disc drive device 100 may not enter the sleep mode, and so will consume a normal amount of power.

Figure 8:
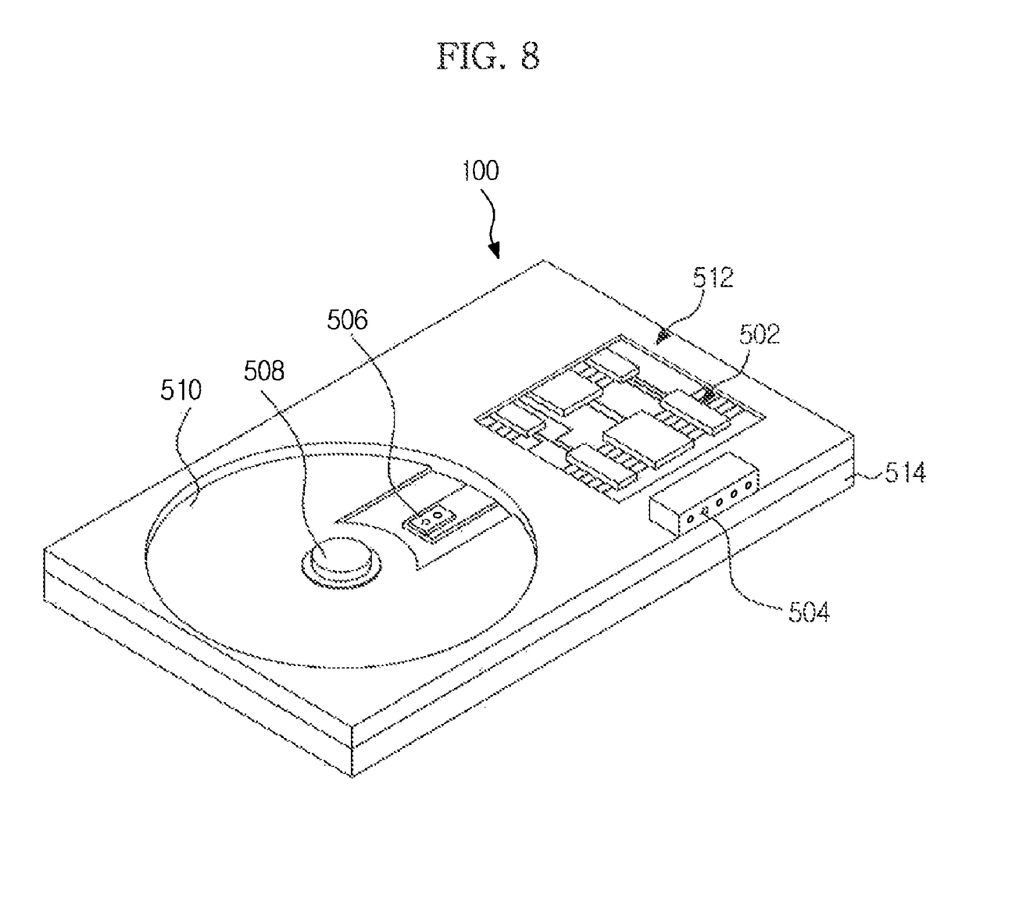
FIG. 8 illustrates an example of an optical disc drive device or module.

FIG. 8 illustrates one example of an optical disc drive device 100 according to an embodiment of the present general inventive concept. The optical disc drive device 100 may be a module that is connectable to a host 200 via a connection terminal 504. The host 200 may transmit a sleep command to the optical disc drive device 100 via the connection terminal 504, and the optical disc drive device 100 may transmit data, such as sleep state error data when the optical disc drive device 100 is not in a state to enter a sleep mode, to the host 200 via the connection terminal 504.

The optical disc drive device 100 may include an outer case, frame, or shell 514. An opening 512 is illustrated for convenience purposes to illustrate that the optical disc drive device 100 may include circuitry 502 such as one or more processors, memory, and other logic units that may make up the optical disc drive device controller 10, memory 11, digital signal processor 9, and other components of the optical disc drive device 100. The case 514 may include a recess 510 to receive an optical disc 1, a spindle motor mount 508 on which the center hole of the disc 1 may be mounted, and an optical device 506, corresponding to the optical pickup 2 of FIG. 1, to read data from and write data to an optical disc 1.

The optical disc drive device may be mechanically and electrically separable from the host 200 without the use of solder connections, for example. Alternatively, the optical disc drive device 100 may be integrated with the host 200 such that the optical disc drive device 100 is connected to the host 200 with solder, screws, or other connection devices, and the memory 11, optical disc drive device controller 10, and digital signal processor 9 may be located within a host device 200 or may be shared with a host device 200.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An optical disc playback apparatus comprising:
   a main controller to transmit a sleep mode transition command to an optical disc drive device; and an optical disc drive device controller to detect at least one of a status of an optical disc and a status of the optical disc drive device when the sleep mode transition command is transmitted to the optical disc drive device, and to determine whether to perform transition to the sleep mode in response to the detected optical disc status or optical disc drive device status.

2. The apparatus according to claim 1, wherein the status of the optical disc includes an eccentricity amount of the optical disc, and
the optical disc drive controller prevents the transition to the sleep mode when the recognized eccentricity amount of the optical disc is equal to or greater than a reference value.

3. The apparatus according to claim 1, wherein the status of the optical disc includes a deviation amount of the optical disc, and
the optical disc drive device controller prevents the transition to the sleep mode when the recognized deviation amount of the optical disc is equal to or greater than a reference value.

4. The apparatus according to claim 1, wherein the status of the optical disc includes a defect of the optical disc, and
the optical disc drive device controller prevents the transition to the sleep mode when the defect is present in the optical disc.

5. The apparatus according to claim 1, wherein the status of the optical disc drive device includes a determination regarding whether the optical disc drive device fails to read data, and
the optical disc drive controller prevents the transition to the sleep mode when the optical disc drive device fails to read data.

6. The apparatus according to claim 1, wherein the status of the optical disc drive device includes a determination regarding whether the optical disc drive device is reading data from an area within a reference range from an outermost circumference of the optical disc, and
the optical disc drive controller prevents the transition to the sleep mode when the optical disc drive device is reading data from an area contained in the reference range from the outermost circumference of the optical disc.

7. The apparatus according to claim 1, wherein the status of the optical disc drive device includes a temperature of the optical disc drive device, and
the optical disc drive device controller prevents the transition to the sleep mode when the detected temperature is out of a reference temperature range.

8. The apparatus according to claim 1, further comprising:
a data buffer to store output data of the optical disc drive device; and
a buffer data detector to detect an amount of the data stored in the data buffer.

9. The apparatus according to claim 8, wherein when the buffer data detector detects that the data stored in the data buffer is equal to or greater than a reference value, the main controller transmits the sleep mode transition command to the optical disc drive device controller.

10. An optical disc playback apparatus to store output data of an optical disc drive device in a data buffer, and to output the stored data as video or audio data, the apparatus comprising:
a buffer data detector to detect an amount of data stored in the data buffer;
a main controller to transmit a sleep mode transition command to the optical disc drive device when the detected data amount is equal to or greater than a reference value; and
an optical disc drive device controller to detect at least one of a status of an optical disc and a status of the optical disc drive device when the sleep mode transition command is transmitted to the optical disc drive device, and to determine whether to perform transition to the sleep mode in response to the detected at least one of the optical disc status and the optical disc drive device status.

11. The apparatus according to claim 10, wherein the status of the optical disc includes a degree of eccentricity of the optical disc, and
the optical disc drive device controller prevents the transition to the sleep mode when the degree of eccentricity of the optical disc is equal to or greater than a reference value.

12. The apparatus according to claim 10, wherein the status of the optical disc includes a deviation amount of the optical disc, and
the optical disc drive device controller prevents the transition to the sleep mode when the deviation amount of the optical disc is equal to or greater than a reference value.

13. The apparatus according to claim 10, wherein the status of the optical disc includes a defect of the optical disc, and
the optical disc drive device controller prevents the transition to the sleep mode when the defect is present in the optical disc.

14. The apparatus according to claim 10, wherein the disc drive device status includes a determination regarding whether the optical disc drive device fails to read data, and
the optical disc drive device controller prevents the transition to the sleep mode when the optical disc drive device fails to read data.

15. The apparatus according to claim 10, wherein the optical disc drive device status includes a determination regarding whether the optical disc drive device is reading data from an area contained in a reference range from an outermost circumference of the optical disc, and
the optical disc drive device controller prevents the transition to the sleep mode when the optical disc drive device is reading data from an area within the reference range from the outermost circumference of the optical disc.

16. The apparatus according to claim 10, wherein the optical disc drive device status includes a temperature of the optical disc drive device, and
the optical disc drive device controller prevents the transition to the sleep mode when the detected temperature is out of a reference temperature range.

17. A method of controlling an optical disc playback apparatus comprising:
determining whether a condition is met to place an optical disc drive device in a sleep mode;
detecting at least one of a status of an optical disc and a status of the optical disc drive device when the condition is met; and
determining whether to perform transition to the sleep mode according to the detected at least one of the optical disc status and the optical disc drive device status.

18. The method according to claim 17, wherein the optical disc playback device includes a data buffer for storing data generated from the optical disc drive device, and the condition to place the optical disc drive device in the sleep mode is a determination that an amount of data stored in the data buffer is equal to or greater than a reference value.

19. The method according to claim 17, wherein the determining whether to perform transition to the sleep mode according to the optical disc status includes:
    detecting an eccentricity amount of the optical disc, and deciding not to perform transition to the sleep mode when the detected eccentricity amount of the optical disc is equal to or greater than a reference value.

20. The method according to claim 17, wherein the determining whether to perform transition to the sleep mode according to the optical disc status includes:
    detecting a deviation amount of the optical disc, and deciding not to perform transition to the sleep mode when the detected deviation amount of the optical disc is equal to or greater than a reference value.

21. The method according to claim 17, wherein the determining whether to perform transition to the sleep mode according to the optical disc status includes:
    detecting a defect of the optical disc, and deciding not to perform transition to the sleep mode when the defect is present in the optical disc.

22. The method according to claim 17, wherein the determining whether to perform transition to the sleep mode according to the optical disc drive device status includes:
    determining whether the optical disc drive device fails to read data, and deciding not to perform transition to the sleep mode when the optical disc drive device fails to read data.

23. The method according to claim 17, wherein the determining whether to perform transition to the sleep mode according to the optical disc drive device status includes:
    determining whether the optical disc drive device is reading data from an area contained in a reference range from an outermost circumference of the optical disc, and deciding not to perform transition to the sleep mode when the optical disc drive device is reading data from an area contained in the reference range from the outermost circumference of the optical disc.

24. The method according to claim 17, wherein the determining whether to perform transition to the sleep mode according to the optical disc drive device status includes:
    detecting a temperature of the optical disc drive device, and deciding not to perform transition to the sleep mode when the detected temperature is out of a reference temperature range.

25. An optical disc drive apparatus, comprising:
    a controller to receive an input to direct the optical disc drive device to enter a sleep mode, to detect a status of at least one of an optical disc and the optical disc drive apparatus, and to determine whether to direct the optical disc drive device to enter the sleep mode based on the detected status of the at least one of the optical disc and the optical disc drive apparatus.

26. The optical disc drive apparatus of claim 25, further comprising a connection terminal to receive the data to direct the optical disc drive to enter the sleep mode and to transmit data indicating that the sleep mode is disabled based on the detected status of the at least one of the optical disc and the optical disc drive apparatus.

27. The optical disc drive apparatus of claim 26, further comprising:
    an optical pickup to read data from and write data to the optical disc;
    motor control circuitry to control operation of the optical pickup and the optical disc; and
    an outer case to surround the optical pickup and the motor control circuitry.

28. The optical disc drive apparatus of claim 25, further comprising:
    an optical pickup to read data from the optical disc and to detect the status of the optical disc.

29. The optical disc drive apparatus of claim 25, wherein the status of the optical disc is one of the eccentricity and deviation of the optical disc.

30. The optical disc drive apparatus of claim 25, wherein the status of the optical disc drive apparatus is one of a temperature of the optical disc drive apparatus, a determination of a failure of an optical pickup to read data from the optical disc, and a determination of region of the optical disc read by the optical pickup.

* * * * *